(12) United States Patent
Nied et al.

(10) Patent No.: US 7,651,276 B2
(45) Date of Patent: Jan. 26, 2010

(54) BEARING UNIT

(75) Inventors: Hartmut Nied, Waiblingen (DE);
Wolfgang Oetken, Wendlingen (DE);
Ulrich Scholz, Nürtingen (DE)

(73) Assignee: Daimler AG, Stuttgart (DE)

( * ) Notice: Subject to any disclaimer, the term of this patent is extended or adjusted under 35 U.S.C. 154(b) by 852 days.

(21) Appl. No.: 11/328,739

(22) Filed: Jan. 10, 2006

(65) Prior Publication Data

US 2006/0133709 A1 Jun. 22, 2006

Related U.S. Application Data

(63) Continuation-in-part of application No. PCT/EP2004/007275, filed on Jul. 3, 2004.

(30) Foreign Application Priority Data

Jul. 11, 2003 (DE) ................ 103 31 348

(51) Int. Cl.
*F16C 19/52* (2006.01)
(52) U.S. Cl. ............... 384/557; 384/493; 384/571; 384/905
(58) Field of Classification Search ........... 384/493, 384/557, 571, 905; 74/409
See application file for complete search history.

(56) References Cited

U.S. PATENT DOCUMENTS

| 1,503,849 A | 8/1924 | Proctor |
| 1,614,992 A | 1/1927 | Roberts |
| 2,149,009 A | 2/1939 | Chievitz |
| 2,563,680 A | 8/1951 | Hoffman |
| 3,838,751 A | 10/1974 | Brown |
| 4,004,472 A | 1/1977 | Millward et al. |
| 6,293,704 B1 * | 9/2001 | Gradu .................. 384/557 |
| 7,175,350 B2 * | 2/2007 | Gradu et al. ............ 384/557 |
| 7,318,759 B2 * | 1/2008 | Bristol et al. ........... 384/557 |

FOREIGN PATENT DOCUMENTS

| DE | 244 474 | 3/1912 |
| DE | 1 158 376 | 11/1963 |
| DE | 25 38 230 | 12/1976 |
| DE | 31 40 330 | 4/1983 |
| DE | 35 22 600 | 1/1987 |
| DE | 198 08 566 | 7/1999 |
| FR | 2 552 833 | 4/1985 |
| JP | 09 152008 | 6/1997 |
| JP | 2002 070994 | 3/2002 |

* cited by examiner

*Primary Examiner*—Thomas R Hannon
(74) *Attorney, Agent, or Firm*—Klaus J. Bach

(57) ABSTRACT

In a bearing unit for a drive shaft mounted cantilevered in a housing by means of two rolling bearings and having a driving bevel gear wherein the drive shaft is mounted in the drive housing via a bearing bush and the bearing bush is axially supported at one end by a bearing bush support part and the rolling bearings are supported in the bearing bush spaced from the one end thereof so that, during heating, the bearing bush expands inwardly toward the driving bevel gear mounted on the shaft whereas the drive housing expands outwardly away from the driving bevel gear, the gear drive housing and the bearing bush consist of a light metal alloy and the bearing bush support part consists of an iron material.

9 Claims, 2 Drawing Sheets

BEARING UNIT

This is a Continuation-In-Part Application of International Application PCT/EP2004/007275 filed Jul. 3, 2004 and claiming the priority of German application 103 31 348.6 filed Jul. 11, 2003.

BACKGROUND OF THE INVENTION

The invention relates to a bearing unit for a gear drive having a drive shaft supported in a drive housing via at least one rolling bearing and a bearing bush receiving the rolling bearing, the bearing bush being axially supported in the drive housing by an axial bearing surface.

A drive shaft of an axle drive of a motor vehicle in an axle housing with two tapered roller bearings arranged in axially spaced relationship to one another is already known from DE 198 08 566 C1. One of the two tapered roller bearings is mounted in the axle housing via a housing insert which is separate from the axle housing. The axle housing is formed from light metal and the housing insert from steel or cast iron.

It is the object of the present invention to provide a bearing bush having a plurality of bearing surfaces for all the rolling bearings of the drive shaft in such a way that the entire bearing arrangement for supporting a shaft can be mounted in a simple way and a displacement of the shaft in the axial direction due to thermal expansion is compensated for.

SUMMARY OF THE INVENTION

In a bearing unit for a drive shaft mounted cantilevered in a housing by means of two rolling bearings and having a driving bevel gear wherein the drive shaft is mounted in the drive housing via a bearing bush and the bearing bush is axially supported at one end by a bearing bush support part and the rolling bearings are supported in the bearing bush spaced from the one end thereof so that, during heating, the bearing bush expands inwardly toward the driving bevel gear mounted on the shaft whereas the drive housing expands outwardly away from the driving bevel gear, the gear drive housing and the bearing bush consist of a light metal alloy and the bearing bush support part consists of an iron material.

As a result, during the heating of the bearing bush, the entire drive shaft is displaced in accordance with the expansion of the bearing bush. Since the bearing bush is mounted in the axial direction via only one axial bearing surface, the expansion of at least part of the bearing bush in the axial direction takes place in only one direction according to the positioning of the axial bearing surface.

By means of the bearing bush which receives all the rolling bearings, the entire drive shaft can be mounted with a corresponding duct geometry in the bearing bush via two rolling bearings, so that the entire bearing unit can be installed in the drive housing in a simple way as a unit consisting of drive shaft, rolling bearing and bearing bush. The bearing unit is installed in the drive housing from one side. The drive housing is sealed off correspondingly at only one point.

Furthermore, the bearing bush is connected to the drive housing indirectly via at least one bearing part at least in the axial direction with respect to the axis of rotation. The use of a bearing part makes it possible to influence the thermally induced axial displacement of the drive shaft. By means of the bearing part, the thermal expansion in the axial direction can be set insofar as the bearing part has a coefficient of thermal expansion different from that of the bearing bush or the drive housing. In the case of conventional bearing dimensions in the motor vehicle sector, the combination of light-metal housings with bearing bushes made from light metal and of bearing parts made from iron material has proved highly advantageous.

This type of construction of the bearing bush is particularly advantageous in connection with shafts carrying bevel-gears that are in engagement with crown gears. A compensation of the thermally induced expansion in the axial direction is achieved, which reduces a displacement in the toothing between bevel gears and crown gears to a minimum. Depending on the choice of material of the drive housing, the bearing part and the bearing bush based on the respective lengths of the parts, the ratio of the respective elongations can be defined, and the amount of displacement in the toothing can be reduced to a minimum.

In this respect, it is advantageous if the bearing bush is mounted in the drive housing in such a way that, during operationally induced heating, the bearing surfaces are displaced into the drive housing in the axial direction in relation to the drive housing. What is achieved thereby is that the thermally induced expansion of the drive housing is compensated for in the opposite direction. The drive housing, during heating, also expands outward in the axial direction. The bearing bush mounted in the drive housing is consequently likewise displaced outward. At the same time, however, the bearing bush expands inwardly, so that a compensation for the expansions in the axial direction is achieved.

The values necessary for determining the ratio can be determined by means of tests. With such a ratio, the displacement occurring in the toothing at the operating temperature can be calculated very easily. The power drive efficiency is therefore optimized and the generation of noise is markedly reduced.

It is possible that, with regard to an imaginary fixed point on the axis of rotation within the drive housing, a distance between the bearing bush and the fixed point can be defined as a function of a specific operating temperature by means of an actual choice of material for at least the drive housing, the bearing part and the bearing bush. The above-described absolute outward displacement of the bearing bush together with the drive housing and the opposite inward expansion of the bearing bush with respect to the drive housing can, according to the invention, provide for a constant distance. By an appropriate choice of material, based on a given geometry, or a particular geometry on the basis of given materials, a specific distance can be set which brings about the best possible position in tooth engagement at operating temperature.

In the same way as the thermally induced expansions of the bearing unit and of the drive housing, expansion of the crown gear in the axial direction can likewise be taken into account, for example in a combination of bevel gear and crown gear, in terms of the tooth engagement point. By the bearing bush being designed according to the invention, the thermal expansion in the axial direction which is attributable to the respective components is separated structurally or in design terms, so that the displacement of tooth engagement can be calculated more simply.

In connection with the solution according to the invention, it is advantageous that the drive shaft is mounted in the bearing unit movably in one direction only and all the rolling bearings are arranged in the axial direction on one side of the axial support surface of the bearing bush. By the bearing bush being mounted on one axial end thereof, the elongation in the opposite direction according to the invention of drive housing and bearing bush is established. In the region in which the bearing bush is movable in the axial direction, it is radially supported directly in the drive housing and, if a bearing structure is used, is supported indirectly via the latter in the drive housing.

In this respect, it is advantageous if the bearing bush has an external thread and is screwed, oil-tight, via a corresponding internal thread on the support of the drive housing. This provides for a connection which can be established in a simple way and in which the forces are transmitted from the bearing bush to the support part. For this purpose, the bearing bush bears in the axial direction with one end face against the support part. The force is transmitted to the support part via this end face.

According to a preferred embodiment of to the invention, finally, the bearing bush has an outer fitting surface oriented in the radial direction, and the fitting surface has, over the circumference, at least in a part region, a recess which extends over the entire axial length of the fitting surface. This ensures that the one-sided support arrangement of the drive shaft receives the necessary supply of lubricant. The reduction of the diameter in part regions forms a lubricant channel in the axial direction between the bearing bush and the drive housing. Furthermore, the use of two rolling bearings within a bearing bush ensures that the rolling bearing arranged between the first rolling bearing and the support part can be supplied with lubricant. The size of the part region and the difference with respect to the outside diameter of the fitting surface are to be adapted to the respective parameters.

It is also advantageous, in this respect, if the bearing bush has, distributed over the circumference, at least one pair of oil bores or oil ducts which extend in the radial direction, the oil bores being arranged in each case upstream and downstream of the bearing surface of the rolling bearing which is in the form of a pinion flange bearing. The lubricant flowing through the part region in the axial direction is thereby conducted inwardly toward the rolling bearing. The bearing surface of the rolling bearing is advantageously not interrupted by oil bores.

It is important in connection with the present invention that the bearing bush has at least one recess in the region of the oil bores, the recess forming between the drive housing or the bearing part and the bearing bush a volume for the reception of oil which is in communication with at least one oil bore. In this way, an oil reservoir is formed, adjacent the part region in the axial direction. By means of this oil reservoir, oil pressure differences are buffered and the lubrication of the rolling bearings from all sides is ensured.

In connection with the design and arrangement according to the invention, the bearing bush has a bearing shoulder, designed as an axial support for the rolling bearing, and the bearing shoulder has, distributed over the inner circumference, axial passages. The passages ensure that the rolling bearing is supplied with oil or lubricant via the oil bore and that the oil is conducted to the inner rolling bearing from the outer rolling bearing.

It is advantageous, furthermore, if the rolling bearings are mounted on two adjacent support surfaces of the drive shaft and the support surfaces or the rolling bearings are arranged at a distance of 3 to 30 mm, in particular 7 mm. The overall space for mounting the drive shaft is thereby reduced to a minimum. The forces in the radial direction are transmitted via the fitting surface to the drive housing and the forces in the axial direction are transmitted to the latter via the bearing part. Owing to the short distance between the rolling bearings and to the small length of the drive shaft between the rolling bearings, the thermally induced expansion in the axial direction is correspondingly low.

It is of particular importance in connection with the present invention that the drive housing and the bearing bush are formed from a light-metal alloy and the support part from an iron material. What is achieved thereby is that the fit between the bearing bush and the drive housing varies only within the tolerances permissible for the fit because of the identical thermally induced expansion of the bearing bush and of the drive housing providing for a correspondingly reliable and firm fit. The setting of the fit is simplified in that no, or only slightly, different material-related parameters have to be taken into account.

The use of iron material for the support part has advantages for adjusting the tooth engagement point as a function of the coefficient of thermal expansion.

The fit of identical materials which is dependent on the temperature within permissible limits only makes it possible to transmit higher radial bearing forces via the fit. It is possible to select a fit by means of which the bearing bush can be inserted into the drive housing in a simple way. Due to the principle-induced greater heating of the bearing unit, as compared with the drive housing, the fit clearance is reduced and the radial support of the driving bevel gear is improved.

Producing two components fitted together from materials with very different coefficients of thermal expansion leads in the case of narrow fits, depending on the temperature range, to tolerances which are not in the permissible range. In the long term, this leads, in conjunction with the friction generated at the fitting surfaces, to a play within the fit and to a premature wear of the bearing surfaces and of the toothings.

Moreover, it is advantageous if the rolling bearings are tapered roller bearings in an X- or an O-arrangement and the drive shaft carries a driving bevel gear or is designed as a bevel-pinion shaft. The bearing bush according to the invention can be premounted together with the rolling bearings and the bevel-gear shaft and can be installed quickly and simply. The bearing bush supported in the housing via fitted components having identical materials provides, in addition to the advantage of transmitting higher forces, and by receiving two rolling bearings in combination with the measures for a secure oil supply, for advantages which are preeminently suitable for the support of a bevel-gear shaft.

BRIEF DESCRIPTION OF THE DRAWINGS

Further advantages and details of the invention will become more readily apparent from the following description of the invention on the basis of the accompanying drawings:

BRIEF DESCRIPTION OF THE DRAWINGS

Figure 1:
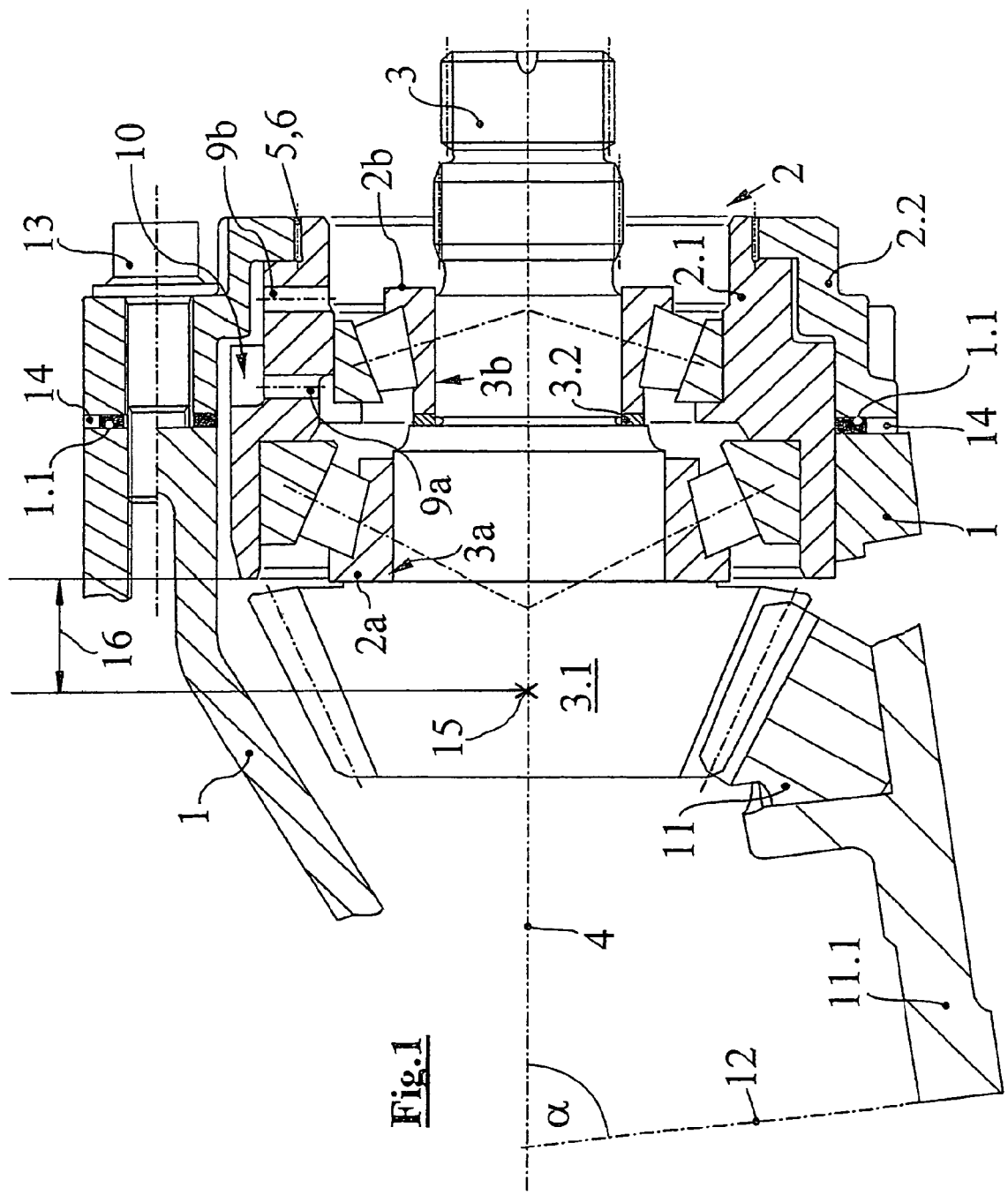
Figure 2:
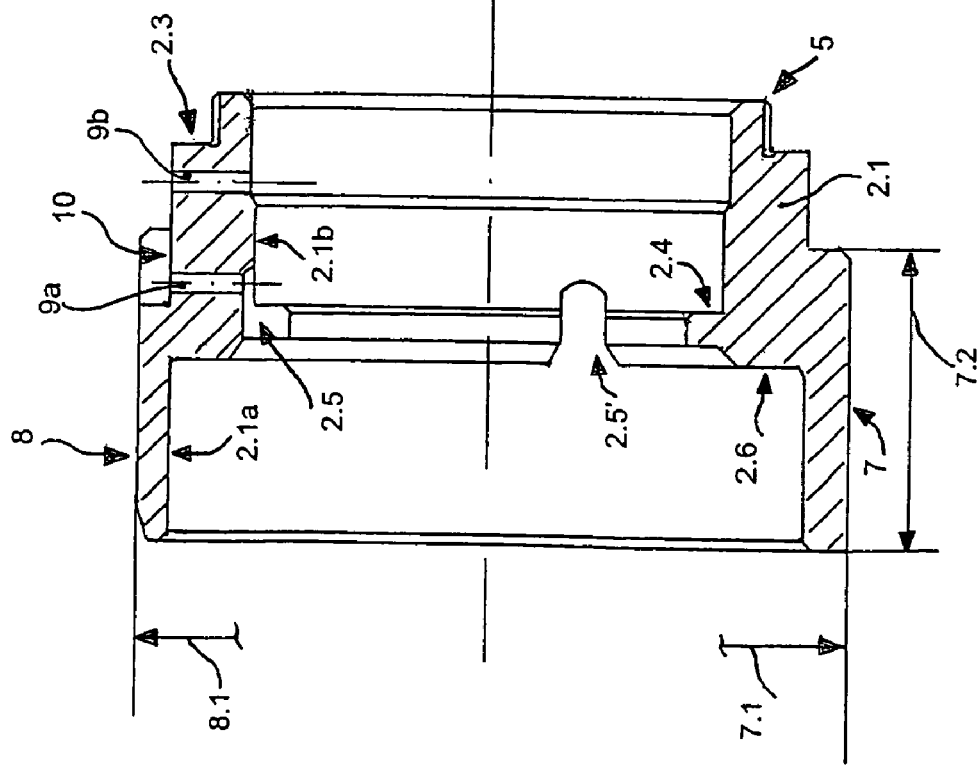

FIG. 1 is a sectional view of a bearing unit with a bearing bush within a drive housing;

FIG. 2 is a sectional view of a bearing bush; and

Figure 3:
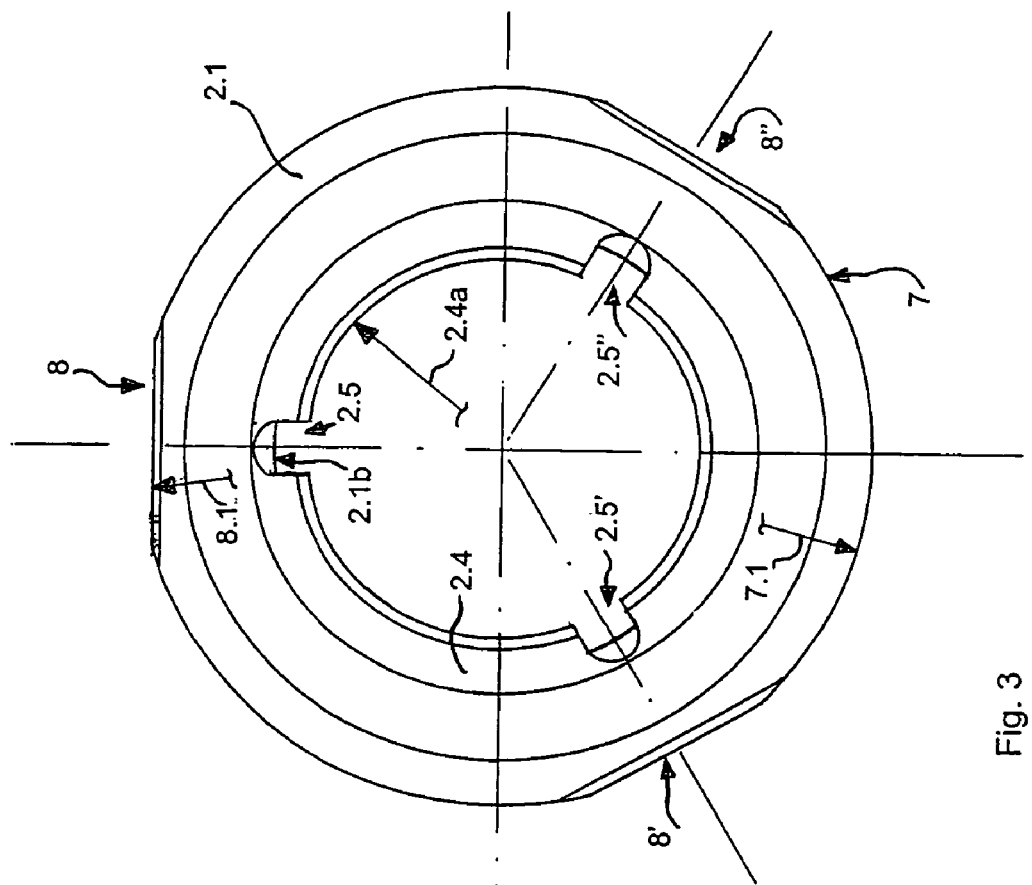

FIG. 3 is a top view of a bearing bush according to FIG. 2.

DESCRIPTION OF A PREFERRED EMBODIMENT

As shown in FIG. 1, a drive shaft 3 is designed as a bevel-gear shaft with a driving bevel gear 3.1 and rotates within a bearing unit 2 about an axis of rotation 4. The driving bevel gear 3.1 meshes with a crown gear 11 which rotates via a crown-gear receptacle 11.1 about a crown-gear axis 12. The crown-gear axis intersects the axis of rotation 4 at an angle α of less than 90°.

The bevel-gear shaft 3 is mounted in a bearing bush 2.1 via two rolling bearings 2a, 2b in the form of tapered roller bearings. The rolling bearing 2b is a pinion flange bearing. For the shaft mounting, the bearing bush 2.1 has two radial bearing surfaces 2.1a, 2.1b and two axial bearing surfaces 2.4, 2.6 in the form of bearing shoulders. The rolling bearings 2a, 2b are disposed at a distance of 7 mm. However, the distance between the rolling bearings 2a, 2b may be between 3 and 30 mm.

The bearing bush 2.1 is mounted in the radial direction in a drive housing 1 and in a bearing housing part 2.2 via a fitting surface 7. The bearing bush 2.1 is supported with respect to the drive housing 1 via an axial support surface 2.3. Moreover, the bearing bush 2.1 is screwed in the axial direction to a bearing part 2.2 via an external thread 5. The bearing part 2.2 is designed as a bearing cover and has a corresponding internal thread 6. The bearing cover 2.2 is fastened to the drive housing 1 via a plurality of bolts 13. One bolt 13 is illustrated by way of example.

The position of the driving bevel gear 3.1 with respect to the crown gear 11 is fixed in the axial direction, in the cold temperature state, via a spacer washer 1.1. Next to the spacer washer 1.1, a sealing means 14 in the form of a washer seal is provided, around the spacer washer 1.1, between the drive housing 1 and the bearing cover 2.2. A further adjustment of the bearing unit 2 takes place via a spacer ring 3.2, which sets the position of the pinion flange bearing 2b with respect to the drive shaft 3.

After the bearing inner ring of the pinion flange bearing 2b has been pressed onto the shank of the drive shaft 3, the driving bevel gear is guided into the premounted bearing unit 2, the spacer ring 3.2, together with the bearing inner ring of the pinion flange bearing 2b, is pressed on, and, after the sealing means 14 has been mounted, the support cover 2.2 is screwed to the drive housing 1.

During the heating of the drive housing 1 and of the entire bearing unit 2 in the operating state, the drive housing 1 and the bearing part 2.2 expand in the axial direction, opposite to the crown gear 11. By contrast, the bearing bush 2.1 expands in the direction toward the crown gear 11 owing to the one-sided axial mounting of the bushing 2.1. An axial distance 16 between an imaginary fixed point 15 on the axis of rotation 4 within the drive housing 1 and the bearing bush 2.1 decreases with an increasing operating temperature.

Bearing against the axial support surface 2.3, the bearing bush 2.1, the rolling bearings 2a, 2b, the drive shaft 3 and therefore also the driving bevel gear 3.1 are moved by thermal expansion in the direction toward the crown gear 11. This provides, in the axial direction, for a compensation of the housing expansion effective in the opposite direction. The displacement in the toothing from the driving bevel gear 3.1 to the crown gear 11 consequently decreases. The generation of noise is mitigated, the wear is reduced and the operational efficiency is increased.

The bearing bush 2.1 is screwed, oil-tight, to the support cover 2.2 via an external thread 5, illustrated in FIG. 2. In the axial direction, the support cover 2.2 bears against an axial support surface 2.3, adjacent to the external thread 5, of the bearing bush 2.1. The bearing forces in the axial direction are transmitted to the support cover 2.2 via the axial support surface 2.3. Moreover, during heating and axial expansion, the bearing bush 2.1 is supported on the support part 2.2 via the axial support surface 2.3. This affords the advantage according to the invention that the tooth engagement point between the crown gear 11 and the driving bevel gear 3.1 remains essentially constant.

As illustrated in FIGS. 2 and 3, the bearing bush 2.1 has, distributed over the circumference, at intervals of 120°, recesses 8, 8', 8'' which have a reduced diameter 8.1, as compared with an outside diameter 7.1 of the fitting surface 7. By means of the recesses 8, 8', 8'', a kind of lubricant passage is formed between the bearing bush 2.1 and the drive housing 1 over an entire axial length 7.2 of the fitting surface 7, so that oil can flow into the bearing unit 2 in the direction of the bearing cover 2.2.

The recesses 8, 8', 8'' are followed in each case by a recess 10 which receives a certain oil volume. The oil is led from the recess 10 upstream and downstream of the tapered roller bearing 2b in each case via a pair of oil bores 9a, 9b. The oil bore 9a extends directly in the region of the recess 10. The oil bore 9b extends in a region of the bearing bush 2.1 which follows the recess 10, adjacent the axial bearing surface 2.3.

The bearing surface 2.1b for the tapered roller bearing 2b is provided between the oil bores 9a, 9b. The oil flowing through the oil bores 9a, 9b is conducted to the tapered roller bearing 2b from both sides.

So that the oil can be supplied more effectively to the tapered roller bearing 2a, the axial bearing 2.4 has, in the region of each of the recesses 8, 8', 8'', a perforation 2.5, 2.5', 2.5'', in which the axial bearing 2.4 is interrupted. For the better conveyance of oil, an inner radius 2.4a of the axial bearing 2.4 is larger in the region of the perforations 2.5, 2.5', 2.5'' than the diameter of the bearing surface 2.1b.

This provides for a continuous oil flow around the two tapered roller bearings 2a, 2b to the rotating driving bevel gear 3.1. The continuously flowing oil stream is improved in that the distance between the two tapered roller bearings 2a, 2b and the two corresponding bearing surfaces 3a, 3b on the bevel-gear shaft 3 is relatively small.

The identical-material fit between the drive housing 1 and bearing bush 2.1 is maintained during the heating of the drive, since the coefficients of thermal expansion are identical. A fit is to be selected which has a narrowness such that the bearing bush 2.1 can easily be introduced into the drive housing 1 for mounting purposes. Owing to the principle-based greater heating of the bearing bush 2.1 or bearing unit 2, the fit clearance is further reduced and the radial support of the driving bevel gear 3.1 is further improved.

The fit which is play-free and wear-free at operating temperature has a substantially higher load-bearing capacity as compared with a fit which is not of uniform material. This affords the possibility of mounting two tapered roller bearings 2a, 2b in the bearing bush 2.1 and of reducing the distance between the tapered roller bearings 2a, 2b to a minimum and thus saving overall space and weight. Separate oil conveyance for lubricating the tapered roller bearings 2a, 2b is not necessary on account of the oil routing according to the invention.

What is claimed is:

1. A bearing unit (2) for a gear drive including a drive shaft (3) supported by a bearing bush (2.1) having a plurality of support surfaces (2.1a, 2.1b) in a gear drive housing (1), at least one rolling bearing (2a) mounted in said bearing bush (2.1), said bearing bush (2.1) being supported in an axially extending bearing bush support part (2.2) of said housing (1) with one end face (2.3) of the bearing bush (2.1) abutting an outer end wall of the bearing bush support part (2.2) and being threaded into the end wall of the bearing bush support part (2.2), said at least one rolling bearing (2a) being supported in the gear drive housing (1) and the bearing bush (2.1) consisting of a light metal alloy and the bearing bush support part (2.2) consisting of an iron material.

2. A bearing unit as claimed in claim 1, wherein the drive shaft (3) is mounted, in the bearing unit (2), with all the rolling bearings (2*a*, 2*b*) arranged at one side with respect to the axial end surface (2.3) of the bearing bush (2.1) connected to the bush support part (2.2).

3. The bearing unit as claimed in claim 1, wherein the bearing bush (2.1) is screwed, oil-tight, by means of an external thread (5), via a corresponding internal thread (6) onto the bush support part (2.2) or the drive housing (1).

4. The bearing unit as claimed in claim 1, wherein the bearing bush (2.1) has an outer axially extending fitting support surface (7) received in the housing (1) and the fitting surface (7) has distributed over the circumference, at least in a part region, a recess (8) which extends over the entire axial length (7.2) of the fitting support surface (7).

5. The bearing unit as claimed in claim 1, wherein the bearing bush (2.1) has a radial support shoulder (2.4), forming an axial support structure, for the rolling bearing (2*b*), and the support shoulder (2.4) has, distributed over the inner circumference, at least one passages (2.5) extending in the axial direction.

6. The bearing unit as claimed in claim 1, wherein the bearing bush support part (2.2) is bolted to the housing (1).

7. A bearing unit according to claim 1, wherein said bearing bush (2.1) is supported in the bearing bush support part (2.2) axially spaced inwardly from the one end face (2.3) of the bearing bush (2.1) toward the gear drive so that, upon heating of the gear drive and outward expansion of the housing (1), the bearing bush (2.1) with the drive shaft (3) expands inwardly thereby maintaining an axial position of a pinion mounted to the inner end of the bearing bush (2.1) essentially constant.

8. The bearing unit as claimed in claim 7, wherein the bearing bush (2.1) has, distributed over the circumference, thereof oil passages (9*a*, 9*b*) which extend in the radial direction, the oil passages (9*a*, 9*b*) being arranged in each case upstream and downstream of the bearing surface (21*b*) of the rolling bearing (2*b*) in the form of a pinion flange bearing.

9. The bearing unit as claimed in claim 8, wherein the bearing bush (2.1) has at least one recess (10) in the region of the oil passages (9*a*, 9*b*), the recess (10) forming between the drive housing (1) or the support part (2.2) and the bearing bush (2.1) a volume for the reception of oil which is in communication with at least one oil bore (9*a*, 9*b*).

* * * * *